United States Patent Office 3,312,557
Patented Apr. 4, 1967

3,312,557
BASIC REFRACTORY PRODUCT
Peter H. Havranek and Ben Davies, Pittsburgh, Pa., assignors to Harbison-Walker Refractories Company, Pittsburgh, Pa., a corporation of Pennsylvania
No Drawing. Filed Oct. 28, 1964, Ser. No. 407,239
6 Claims. (Cl. 106—58)

This invention relates to refractories for oxygen steelmaking furnaces and, in particular, it concerns basic refractory brick particularly suitable for use in the production of steel by the oxygen blowing process, variously referred to, among other terms, as the LD Process, the oxygen converter process, or merely as oxygen steelmaking. Although not limited to this application, the invention provides refractory especially adapted to this service.

The oxygen converter process is only some 10 to 12 years old, but its unique ability to provide good quality steel at a rapid rate has so influenced the steel producing industry that more and more vessels (a term employed to describe the oxygen converter furnace) are being built. The great interest in the oxygen steelmaking process has stimulated considerable pressure on the manufacturers of refractories to supply products better able to withstand the chemical and physical conditions present in the vessel.

As vessels have become larger and larger, the industry has increasingly turned to ceramically bonded or burned basic brick which possess much greater strength than their unburned counterparts. It is conventional to tar impregnate these burned basic brick. The term "tar" is meant broadly to designate the commonly used, nonaqueous, cokable, carbonaceous tars or materials which are recovered from coal and petroleum. A particularly good discussion of these materials will be found in the United States patent to Davies and Weaver, No. 3,070,449, entitled, "Refractory Practices," which issued Christmas Day of 1962.

A very satisfactory brick of the foregoing class is that disclosed in the United States Patent No. 3,106,475, also of Davies and Weaver, entitled, "Burned Refractory Product." The brick or shape of this latter patent consists essentially of at least about 96%, by weight, of MgO, the brick being burned and tar impregnated throughout and characterized by high resistance to impact, abrasion, and to spalling under abrupt temperature changes. The brick is characterized by substantially no loss in an ASTM C-122 panel spalling test with a 3000° F. reheat. These brick are preferably made of the dense, high purity, dead burned MgO grain manufactured by the process of the United States patent to Snyder et al., No. 3,060,000, entitled, "Production of Dead Burned Magnesia." The process of this patent is primarily practiced in a shaft kiln. It is only with some difficulty that satisfactory grain can be commercially made in a rotary kiln.

Thus, it is an object of this invention to provide for manufacture of superior refractory brick of grain made in a rotary kiln.

It is a further object of this invention to provide an improved, tar impregnated, burned, refractory product of at least about 88% to slightly less than 96% MgO content.

Briefly, according to this invention, in one embodiment, basic refractory brick is provided consisting of 88 to less than 96% MgO, from 1 to 3% of a reducible oxide or mixture thereof, the remainder being CaO, $SiO_2$, $Al_2O_3$, and trace impurities, and having a lime/silica ratio greater than 2/1. The trace impurities, and $Al_2O_3$, which is a nonreducible oxide, constitute less than 1%. By reducible oxide, we mean an oxide which, in the presence of carbon or other strong reducing agents, can be reduced to native metal or a suboxide. By "reducing," we mean an environment that will supply reactants to enter into chemical combination below steelmaking temperatures with the reducible oxide and, wholly or in part, remove the oxygen from chemical combination with said reducible oxide.

Brick of the foregoing composition can be made from refractory grain in a conventional manner using conventional sizing and forming techniques. Satisfactory sizing and forming techniques for burned brick are disclosed in United States Patent No. 3,106,475, and are included herein by reference. The included reducible oxide causes brick shrinkage and densification. These brick are then tar-impregnated to provide carbon for the reduction of these reducible oxides to the metal or suboxide at service temperatures.

The reducible oxides serve three important functions. First, they increase the density of the magnesia grain at temperatures normally encountered in rotary kilns. Secondly, they cause shrinkage during burning of brick made from this grain producing a further increase in density. Thirdly, after they have served this purpose and the refractories made from the grain are put in service in a reducing atmosphere, the oxides are subsequently reduced to free metal or suboxides, in which state, and in a surprising unexplained manner, they considerably increase high-temperature strength, as measured in a load test described hereafter.

The lime to silica ratio is critical. It must be greater than 2 to 1. In other words, there must always be lime (CaO) present in sufficient weight excess over the silica ($SiO_2$) present to assure formation of refractory dicalcium silicate or tricalcium silicate.

Many prior workers have suggested the addition of oxides such as iron oxide and others to a magnesia or dolomitic rotary kiln feed in order to obtain sintering and densification of the resultant product. See, for example, the United States patent to Hughey (magnesite), No. 2,640,759, and that of Atlas (dolomite), No. 3,074,806. Hughey states that "fluxing agents" (which terminology includes mill scale, which is essentially all iron oxide) can range between 0.05 and 12%. His examples all call for 4, 5, and as high as 7% of mill scale or an equivalent material, hematite iron. He also notes that "very active" fluxing agents such as boron compounds or soda compounds are used in the smallest amount.

However, the very presence of these oxides in a magnesite product which has a lime to silica ratio greater than 2/1 sharply lowers the refractoriness thereof and, in particular, the ability of the refractory to stand up under high temperature load. Indeed, it is quite difficult to entirely eliminate these materials. To the prior practitioners in the art, the iron oxide or like reducible oxide served the additional and beneficial effect of reducing hydration tendency of free lime by reacting therewith to form such as calcium ferrite.

In the absence of free lime, and in the presence of magnesia, these oxides would react to form magnesium ferrites. Further, when the system included both lime and silica in the molar ratio of 2/1, these two materials preferentially reacted to form dicalcium silicate, with the iron oxide reacting with magnesia to form magnesium ferrite. In and of themselves, all of these reactions were not considered unfavorable, since they served to dry up the iron as a higher melting point phase. A distressing characteristic of such systems, however, particularly at elevated temperatures, is that dicalcium silicate and magnesium ferrite have a very low melting point reaction product. Because of this, prior workers would attempt to eliminate lime or, in some manner, prevent the existence of both magnesium ferrite and dicalcium silicate or of dicalcium silicate and calcium ferrite in the same system.

According to the present invention, after we have used the iron oxide or comparable reducible oxide, we use it in products in a way as to provide the destruction of its reactive character, i.e. reduced to a metal (or suboxide in the case of other reducible oxides such as $TiO_2$). Thus, there is no ferrite phase, and the danger of forming low melting point fluids is greatly reduced or eliminated. It is, of course, essential that we so constitute the refractory that the reducing agents will be available where needed.

According to one aspect, one can view the reducible oxide as an ephemeral process entity, which is introduced into the system to do a job (increase density by shrinking the system), and which is then destroyed or, at least, its original form is changed to render it ineffectual or inactive in the resulting product.

Another critical feature of the present invention is the maintenance of nonreducible oxides, such as $Al_2O_3$, below 1%. When $Al_2O_3$ is present in an amount greater than 1%, superior brick are not obtained.

To produce brick of improved quality for basic oxygen furnace service, it is first necessary to produce refractory grain of satisfactory chemical composition and in the correct physical state. While those knowledgeable in the art may disagree on the best chemical composition, all would agree that the correct or best physical state is one in which the bulk specific gravity of the refractory grain closely approaches its true specific gravity. Stated another way, the true porosity of the grain should be at a minimum. The bulk specific gravity of magnesia grain to be used in the manufacture of refractories for oxygen steelmaking should not be lower than about 3.10 and, preferably, should be at least 3.25.

To burn a magnesia grain with a lime/silica ratio greater than 2 to 1 to a very dense condition sometimes requires either very high burning temperatures normally found only in a shaft kiln (see the Snyder U.S. Patent No. 3,060,000), or the grain must be adulterated with oxides that will act as sintering agents at temperatures encountered when burning in a rotary kiln (see the Hughey Patent No. 2,640,759).

*Example I*

In actual practice, when magnesite grain with 0.9% silica, 3.0% lime, 0.7% accessory oxides, and the remainder MgO, was burned in a rotary kiln in temperatures in excess of 3000° F., the bulk specific gravity was only about 2.6 to 2.8. Grain of this density is normally considered too low to make satisfactory brick for oxygen steelmaking service. Brick were made in the laboratory from this low density grain and from a grain of similar composition that had been burned to the very high density of 3.31 in a shaft kiln. These brick were then burned in a laboratory kiln at cone 23 (2820° F.). Test results on the brick of shaft kiln type grain are shown in Table I. The bulk density of brick made from grain produced in the rotary kiln was only 164 pounds per cubic foot. In comparison, brick made from the denser shaft kiln grain had a bulk density of 181 pounds per cubic foot.

These two brick of different density were heated at 300° F. per hour under a load of 250 p.s.i., and in an oxidizing atmosphere. The brick with a density of only 164 pounds per cubic foot failed at 2550° F. In contrast, the high density brick showed only 4.6% subsidence after being held at 2700° F. for five hours under this heavy lead.

TABLE I

|  | Shaft Kiln Type Grain [1] | Rotary Kiln Type Grain |
|---|---|---|
| Silica ($SiO_2$) | 1.1% | 0.9%. |
| Alumina ($Al_2O_3$) | 0.3% | 0.4%. |
| Iron Oxide ($Fe_2O_3$) | 0.3% | 0.3%. |
| Lime (CaO) | 2.9% | 3.0%. |
| Magnesia (MgO) | (Remainder, by difference) | |
| Grain Bulk Specific Gravity | 3.31 | 2.65. |
| Brick Bulk Density, pcf | 181 | 164. |
| Load Test at 250 p.s.i., 5-hour hold at 2,700° F.: | | |
| Oxidizing Atmosphere | No failure; subsided 4.6%. | Failed at 2,550° F. |
| Reducing Atmosphere | No failure; subsided 3.0%. | Failed at 2,680° F. |

[1] Same as Brick A of Table II.

The brick of Table I were impregnated with a liquid pitch. The test under 250 p.s.i. load was repeated with these pitch-impregnated brick in an atmosphere of 12% carbon monoxide and 88% nitrogen (a "reducing" atmosphere) in a kiln to prevent oxidation of the carbon residue from the pitch. When tested in this manner, the failure temperature of the low density brick (the one of rotary kiln grain) increased to 2680° F.; but they still failed in the test.

This unexpected increase in strength, for the low density grain led to further studies to see if a more dense rotary kiln grain would improve the load test results.

In the next series of tests, a group of compacts or briquettes was made in the laboratory from a base composition of 1% silica, 3.5% lime, about 0.7% accessory oxides, and the remainder MgO. Additions of various amounts of reducible oxides were made to the same base mix.

*Example II*

As a standard, we burned one series of compacts to 2910° F., with no additions, and they had a bulk specific gravity of only 2.94. In contrast, those compacts with additions of 1 to 3% of iron oxide (specimens equivalent to brick D, E, and F of Table II) or manganese oxide (G and H) had bulk specific gravities of 3.38 to 3.42. These results demonstrated that these reducible oxides, in small amounts, could be used to densify magnesia having a high lime/silica ratio at temperatures even lower than normally encountered in rotary kilns (these kilns usually are fired up to about 2900 to 3200° F.).

TABLE II

| | None | Al₂O₃ | | Fe₂O₃ | | | MnO₂ | | TiO₂ | |
|---|---|---|---|---|---|---|---|---|---|---|
| | A | B | C | D | E | F | G | H | K | L |
| Brick Analysis: | | | | | | | | | | |
| Silica (SiO₂) | 0.9 | 1.2 | 1.0 | 1.1 | 1.1 | 1.1 | 1.2 | 1.1 | 0.9 | 1.0 |
| Alumina (Al₂O₃) | 0.3 | 1.4 | 2.0 | 0.4 | 0.4 | 0.4 | 0.5 | 0.3 | 0.3 | 0.3 |
| Iron Oxide (Fe₂O₃) | 0.3 | 0.3 | 0.3 | 1.2 | 1.8 | 2.3 | 0.4 | 0.3 | 0.3 | 0.3 |
| Chromic Oxide (Cr₂O₃) | | | | | | | | | | |
| Manganese (MnO) | | | | | | | 0.9 | 1.7 | | |
| Titania (TiO₂) | | | | | | | | | 1.0 | 1.9 |
| Lime (CaO) | 3.0 | 3.0 | 2.7 | 3.0 | 2.9 | 2.9 | 3.1 | 3.0 | 3.0 | 3.0 |
| Magnesia (MgO) | | | | Remainder, By Difference | | | | | | |
| Grain Density Bulk Density, pcf | 181 | 183 | 183 | 181 | 184 | 184 | 184 | 184 | 187 | 187 |
| Load Test at 250 p.s.i., 5-Hour Hold at 2,700° F.: | | | | | | | | | | |
| Oxidizing Atmosphere: | | | | | | | | | | |
| Subsidence, percent | 4.6 | | | | | | | | | |
| Temperature of Failure, °F | | 2,370 | 2,460 | 2,550 | 2,440 | 2,420 | 2,690 | 2,700 | 2,500 | 2,600 |
| Reducing Atmosphere: | | | | | | | | | | |
| Subsidence, percent | 3.0 | | | 0.3 | 0.6 | 0.9 | 2.1 | 2.7 | 1.2 | 1.5 |
| Temperature of Failure, °F | | 2,590 | 2,550 | | | | | | | |

Considering Table II, brick of ten different chemical compositions are shown. Mix A is virtually free of adulterating oxides, and is representative of a chemical composition that requires the very high temperature burning of the shaft kiln to make dense magnesia grain. The other compositions, all containing adulterating oxides, e.g., oxides of alumina (not a reducible oxide), iron oxide, manganese oxide, or titania in various proportions, are representative of compositions that can be burned into dense grain in the rotary kiln.

Brick of these compositions were made in the laboratory and burned to cone 23 (2820° F.). It is to be noted, in all cases, that the brick with the adulterating oxide have higher density. This is primarily the result of higher shrinkage during the burning operation.

The load test under 250 p.s.i. was made on the brick under oxidizing conditions, as previously described under Example I. Only the control mix, A, which was virtually free of adulterating reducible oxides, was capable of carrying this heavy load to 2700° F. with a five-hour hold without failure. The remaining brick failed at temperatures as low as 2370° F. However, when the brick of these twelve compositions were impregnated with pitch and tested in a reducing atmosphere under a 250 p.s.i. load, as previously described in Example I, surprising and unexpected results were obtained. Mixes D, E, and F, which contained various percentages of iron oxide, had failed under oxidizing conditions well below 2700° F. However, with pitch impregnation and under reducing conditions, these brick showed great improvement without failure and with even lower subsidence after being held at 2700° F. for five hours under a 250 p.s.i. load than control brick A of much higher purity. Similarly, the other brick containing manganese oxide and titania, that had failed under oxidizing conditions, were now able to pass the test following pitch impregnation, coupled with the provision of reducing conditions.

Examination of the brick used in the load test with a reducing atmosphere showed that reducible oxides, such as iron, manganese, and chromium, had wholly or in part been reduced to their elemental form. While it could not be clearly established, it appeared that the titania had been reduced to the suboxide $Ti_2O_3$. Only the alumina remained in its original oxide form and, in this form, had combined with the calcium to form minerals that melted at temperatures lower than 2700° F.

*Example III*

We also tested brick made of natural dead burned Austrian magnesite which had been manufactured and tar impregnated according to techniques identical to those of Example I. The oxide analysis of the Austrian magnesite was as follows:

| | Percent |
|---|---|
| Silica (SiO₂) | 0.7 |
| Alumina (Al₂O₃) | 0.5 |
| Iron oxide (Fe₂O₃) | 6.5 |
| Lime (CaO) | 2.6 |
| Magnesia (MgO) | ([1]) |

[1] The remainder, by difference.

The density of the burned brick was 185 pounds per cubic foot, the porosity was 18.6%, the modulus of rupture, p.s.i., at 2300° F. was 570. In the 250 p.s.i. load test, nonimpregnated brick failed at 2490° F., and tar impregnated brick at 2600° F. Note that the brick answered to all our prerequisites as set forth above, except for total $Fe_2O_3$ content, which was above our desired maximum of 3% by weight.

In the foregoing discussion, we have repeatedly mentioned "reducible oxides." Of course, practically any oxide is capable of being reduced when conditions are proper. Therefore, it should be understood that when we use the terminology "reducible oxides," we mean only those oxides which are reducible at steelmaking temperatures. The basic oxygen furnace maximum temperature of operation is about 3000° F. An electric furnace may go as high as 3200 to 3300° F. Therefore, our reducible oxides must be oxides which are reduced to their native metal, or a sub-oxide, at temperatures of less than about 3300° F. The sub-oxide, such as $Ti_2O_3$, must be an oxide which will not react with other components of the brick to form damaging melts below about 2700° F. In any event, the selected oxide does not react with other components of the refractory to form melts below about 2700° F. Included among the reducible oxides, which we can use for the practice of our invention, are the following: the oxides of titanium, zinc, tin, copper, nickel, vanadium, zirconium, manganese, cadmium, and iron.

Perhaps the essence of our discovery is that these reducible oxides, when in a burned brick, are not detrimental to that brick as far as refractoriness goes, as long as they are maintained in a reducing environment during use, and as long as means are provided within the brick for bringing about oxide reduction. The brick are unsatisfactory in oxidizing atmospheres, as our testing shows; but, when maintained in a reducing environment, they are equivalent to very high purity brick made of much more expensive shaft kiln-type grain.

Another important part of our discovery is the critical character of the upper limit for the reducible oxides. We have found that as 3%, by weight, of the oxides is approached and passed, it is not possible to place sufficient carbonaceous material in the brick to assure maintenance of the materials in the reduced condition during an extended service campaign. This is because carbon from the tar is actually consumed in such oxide-reducing processes as $Fe_2O_3 + 3C = 2Fe + 3CO$.

We note above that the range for MgO content in our brick is from at least 88 to less than 96%. A preferred upper limit is 95.5% MgO. With higher MgO contents, it is extremely difficult, if not impossible, to fabricate brick of our required chemistry. The lower limit of 88% is necessary for similar reasons.

For our tar-impregnated refractory, a measuring stick of success is the ability to withstand a 2700° F. temperature under a 250 p.s.i. load, with reducing atmosphere, for five hours without failing. We consider failure to be collapse at a lower temperature than 2700° F., or a subsidence of 5% or greater in five hours. The tar amounts to 3 to 10%, by weight, based on the weight of the brick.

While in the foregoing discussion we have disclosed brick entirely of our special chemistry, it should be understood grain of this chemistry can constitute a portion only of the brick. So a brick might be prepared from a size graded refractory batch of grain selected from the group consisting essentially of dead burned magnesite, dead burned dolomite, and hard burned lime, and a portion being grain of our special chemistry.

Having this described the invention in detail and with sufficient particularity as to enable those skilled in the art to practice it, what is desired to have protected by Letters Patent is set forth in the following claims.

We claim:

1. A tar-impregnated, burned, basic refractory brick made from a grain consisting essentially of at least 88 to less than 96% MgO, from 1 to 3%, by weight, of an oxide of a metal selected from the group consisting of titanium, zinc, tin, copper, nickel, vanadium, manganese, cadmium, zirconium and iron, which selected oxide is reducible and does not react with other components of the brick to form melts below about 2700° F., there being CaO and $SiO_2$ in a weight ratio in which there is at least 2 parts lime for each 1 part of silica, by weight, there being no more than 1% of other impurities including $Al_2O_3$, on an oxide basis, the tar-impregnation being throughout all internal void structure and about exterior surfaces of the brick.

2. Brick according to claim 1 in which the tar is present in an amount sufficient to maintain said reducible oxide as a native metal or sub-oxide when the shape is placed in use and said tar is carbonized.

3. Brick according to claim 1, which brick are capable of maintaining a 250 p.s.i. load for 5 hours at 2700° F. in a reducing atmosphere without failing.

4. A method of making a tar-impregnated, burned, basic refractory brick consisting essentially of the steps of forming a grain, said grain analyzing from at least 88 to less than 96% MgO, from 1 to 3%, by weight, of an oxide of a metal selected from the group consisting of titanium, zinc, tin, copper, nickel, vanadium, manganese, cadmium, zirconium, and iron, which selected oxide is reducible and does not react with other components of the refractory to form melts below about 2700° F., there being CaO and $SiO_2$ in a weight ratio in which there is at least 2 parts lime for each 1 part of silica, by weight, there being no more than 1% of other impurities including $Al_2O_3$, on an oxide basis, size grading said grain in a brickmaking batch, forming said batch into brick, burning said brick, and tar-impregnating said brick throughout all internal void structure and about exterior surfaces thereof.

5. A method according to claim 4 in which the brick is impregnated with a sufficient quantity of tar to maintain said selected oxide as a native metal or sub-oxide when the brick is placed in use and said tar is carbonized.

6. Method according to claim 4 in which the brick is impregnated with sufficient tar such that the brick is capable of maintaining a 250 p.s.i. load for 5 hours at 2700° F. in a reducing atmosphere without failing.

References Cited by the Examiner
UNITED STATES PATENTS

| | | | |
|---|---|---|---|
| 3,093,495 | 6/1963 | Von Mickwitz | 106—58 |
| 3,141,785 | 7/1964 | Davies | 106—59 |
| 3,141,790 | 7/1964 | Davies et al. | 106—58 |
| 3,192,058 | 6/1965 | Davies et al. | 106—58 |

TOBIAS E. LEVOW, *Primary Examiner.*

J. E. POER, *Assistant Examiner.*